US006644850B2

(12) United States Patent
Kuhn et al.

(10) Patent No.: US 6,644,850 B2
(45) Date of Patent: Nov. 11, 2003

(54) TEMPERATURE SENSING DEVICE FOR AN INTERNAL-COMBUSTION ENGINE

(75) Inventors: Joachim Kuhn, Munich (DE); Robert Albiez, Reichertshofen (DE); Dirk Jeschke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/151,024

(22) Filed: May 21, 2002

(65) Prior Publication Data

US 2002/0177937 A1 Nov. 28, 2002

(30) Foreign Application Priority Data

May 22, 2001 (DE) ........................................ 101 24 852

(51) Int. Cl.[7] .......................... G01K 13/02; F01P 7/02; F02D 41/22

(52) U.S. Cl. ....................... 374/145; 374/138; 73/118.2

(58) Field of Search ................................ 374/146, 144, 374/145, 148, 138, 208; 73/118.2, 204.11

(56) References Cited

U.S. PATENT DOCUMENTS 3,968,689 A 7/1976 Leshner
4,074,566 A * 2/1978 Obayashi et al. .......... 73/118.2
5,369,990 A * 12/1994 Zurek et al. ............... 73/118.2
5,941,927 A * 8/1999 Pfitz ........................... 374/144

FOREIGN PATENT DOCUMENTS

| | | |
|---|---|---|
| DE | 2531015 | 1/1977 |
| DE | 3519466 A1 | 12/1985 |
| DE | 3738033 C2 | 9/1993 |
| EP | 0651237 A1 | 5/1995 |
| WO | WO 01/35065 A1 | 5/2001 |

* cited by examiner

*Primary Examiner*—Diego Gutierrez
*Assistant Examiner*—Stanley J. Pruchnic, Jr.
(74) *Attorney, Agent, or Firm*—Crowell & Moring LLP

(57) ABSTRACT

A temperature sensing device for an internal-combustion engine includes a carrier structure, a first sensor element accommodated on the carrier structure, a second sensor element also accommodated on the carrier structure, an engine air guiding device for feeding an engine intake air flow to the first sensor element, and a radiator air guiding device for feeding a radiator air flow passed through an engine radiator to the second sensor element. By way of a compact constructional unit, which can be preassembled, it is possible to centrally sense the temperatures of the two air flows. The obtained measuring signals can be coupled into a cable tree system provided on the vehicle side while the cabling expenditures are reduced.

20 Claims, 2 Drawing Sheets

TEMPERATURE SENSING DEVICE FOR AN INTERNAL-COMBUSTION ENGINE

This application claims the priority of German application 10124852.0, filed May 22, 2001, the disclosure of which is expressly incorporated by reference herein.

BACKGROUND AND SUMMARY OF THE INVENTION

This invention relates to a temperature sensing device for an internal-combustion engine. The invention also relates to an air flow temperature measuring process.

Conventional temperature sensing devices normally comprise sensor elements which permit temperature sensing based on thermodynamic measuring principles, such as a temperature-caused volume change of a fluid, or on the basis of electrical effects, such as changes of a specific resistance. By way of electric lines or thin pipe lines, these sensor elements are connected to a central sensing device. Sensor elements for sensing the engine temperature can be arranged in the area of a cylinder head. Sensor elements for detecting an oil temperature are preferably provided in a line section situated downstream of an oil pump. Sensor elements for detecting an engine intake air temperature can be arranged in an intake line of the engine in front of or behind a filtering device.

By sensing the temperatures of the intake air, the cooling water, and the oil, it is possible to optimize the operation of the engine, particularly with respect to exhaust gas quality. The numerous sensors as well as their coupling to a central engine management unit, however, require high mounting-related expenditures.

It is an object of the invention to provide a temperature sensing device by which at least two measured temperature values advantageously taken into account during the operation of an internal-combustion engine can be sensed in a favorable manner.

According to the invention, this object is achieved by a temperature sensing device for an internal-combustion engine having a carrier structure, a first sensor element accommodated on the carrier structure, a second sensor element accommodated on the carrier structure, an engine air feeding device for feeding an engine intake air flow to the first sensor element, and a radiator air feeding device for feeding a radiator air flow passed through an engine radiator to the second sensor element. The carrier structure is arranged in an area in which the two air flows run adjacent to one another.

As a result, it becomes advantageously possible to centrally sense, by way of a compact and advantageously mountable constructional unit, the temperatures of the two air flows. In this case, the obtained measuring signals can be coupled into a cable tree system provided on the vehicle side while cabling expenditures are reduced. In a particularly advantageous manner, it is possible, for example, prior to an engine start, to check the method of operation of the two sensors with respect to one another and, if necessary, carry out a joint calibration of the two sensors. Because of the local proximity of the two sensor elements, a particularly informative comparison of the respectively sensed temperature values will be possible. Since, during operation of the internal-combustion engine, the temperature sensed by the second sensor element cannot be below the temperature of the intake air, a particularly reliable function testing of the temperature sensing device can be implemented.

The two sensor elements are preferably, by way of the carrier structure, combined with a constructional unit. This results in advantages, particularly with respect to mounting.

According to one particular aspect of the present invention, the two sensor elements are connected by way of common cabling with a cable tree branch provided on the vehicle side. The cabling assigned to the two sensor elements can in this case be connected with the vehicle-side cable tree branch on the vehicle side by way of a common connector plug structure.

Advantageously, the connector plug structure is constructed integrally with the carrier structure. The carrier structure is preferably made of a plastic material and forms a separating wall which separates the two air flows from one another at least before they sweep over the sensor elements.

According to a particular aspect of the invention, the carrier structure is preferably constructed integrally with an air guiding element. This air guiding element is preferably an engine intake air guiding device.

As an alternative thereto, it is also possible to integrate the carrier structure into a blower suspension or a radiator tank of a vehicle radiator. The two sensor elements are preferably arranged adjacent to one another. This results in a particularly compact construction.

The carrier structure is advantageously arranged in an area in which a line device of an engine intake air system extends past a radiator blower. In this area, the engine intake air system is preferably coupled with an engine radiator or a radiator blower device.

It is possible to provide another sensor element, which is also mounted on the carrier structure, for detecting the cooling water temperature. This sensor element preferably is connected also by way of the common cabling to the vehicle-side cable tree.

BRIEF DESCRIPTION OF THE DRAWINGS

Additional details of the invention are contained in the following description and the drawings.

DETAILED DESCRIPTION OF THE INVENTION

Figure 1:
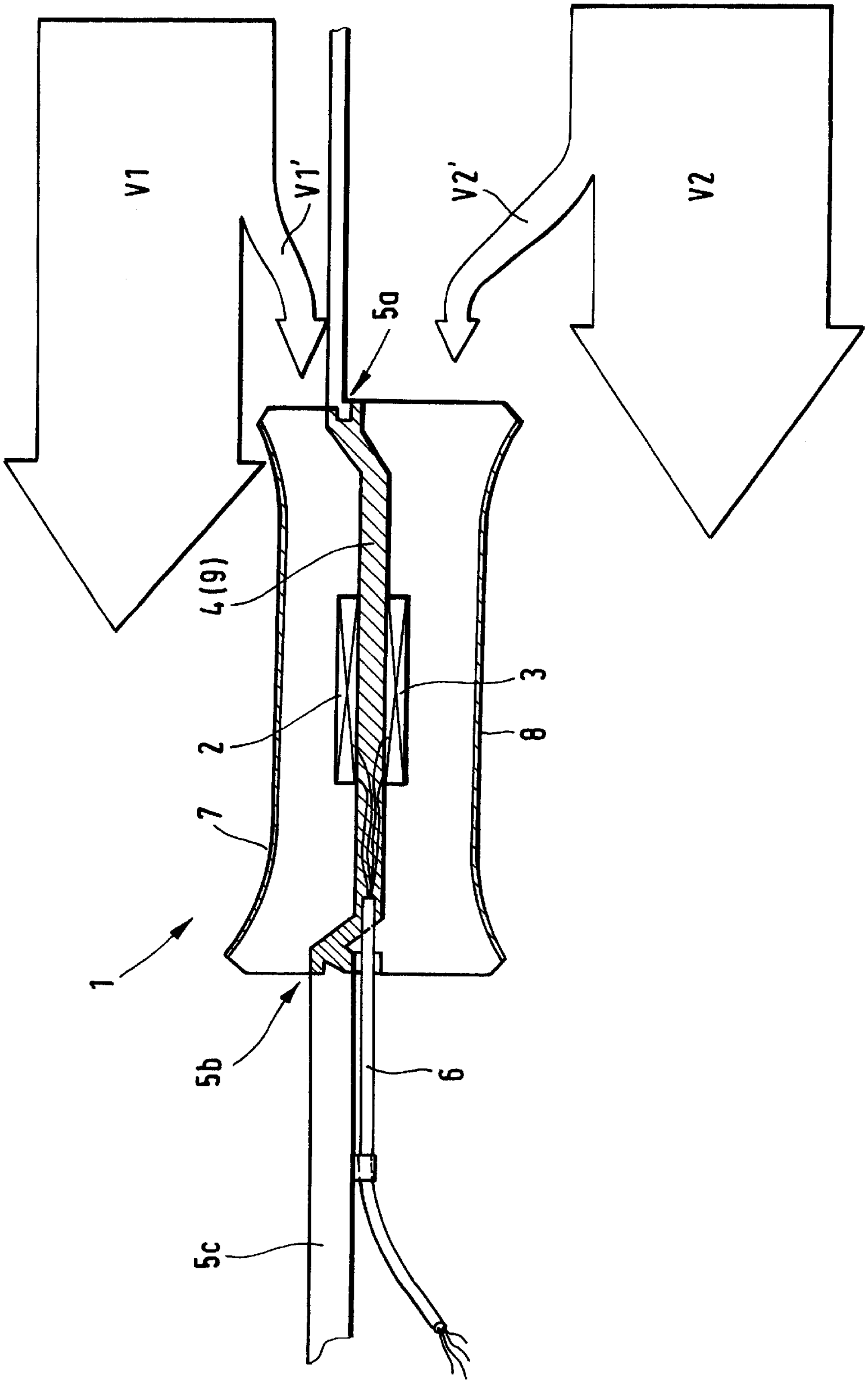
FIG. 1 is a schematic representation for explaining a preferred basic construction of a temperature sensing device according to the invention.
Figure 2:
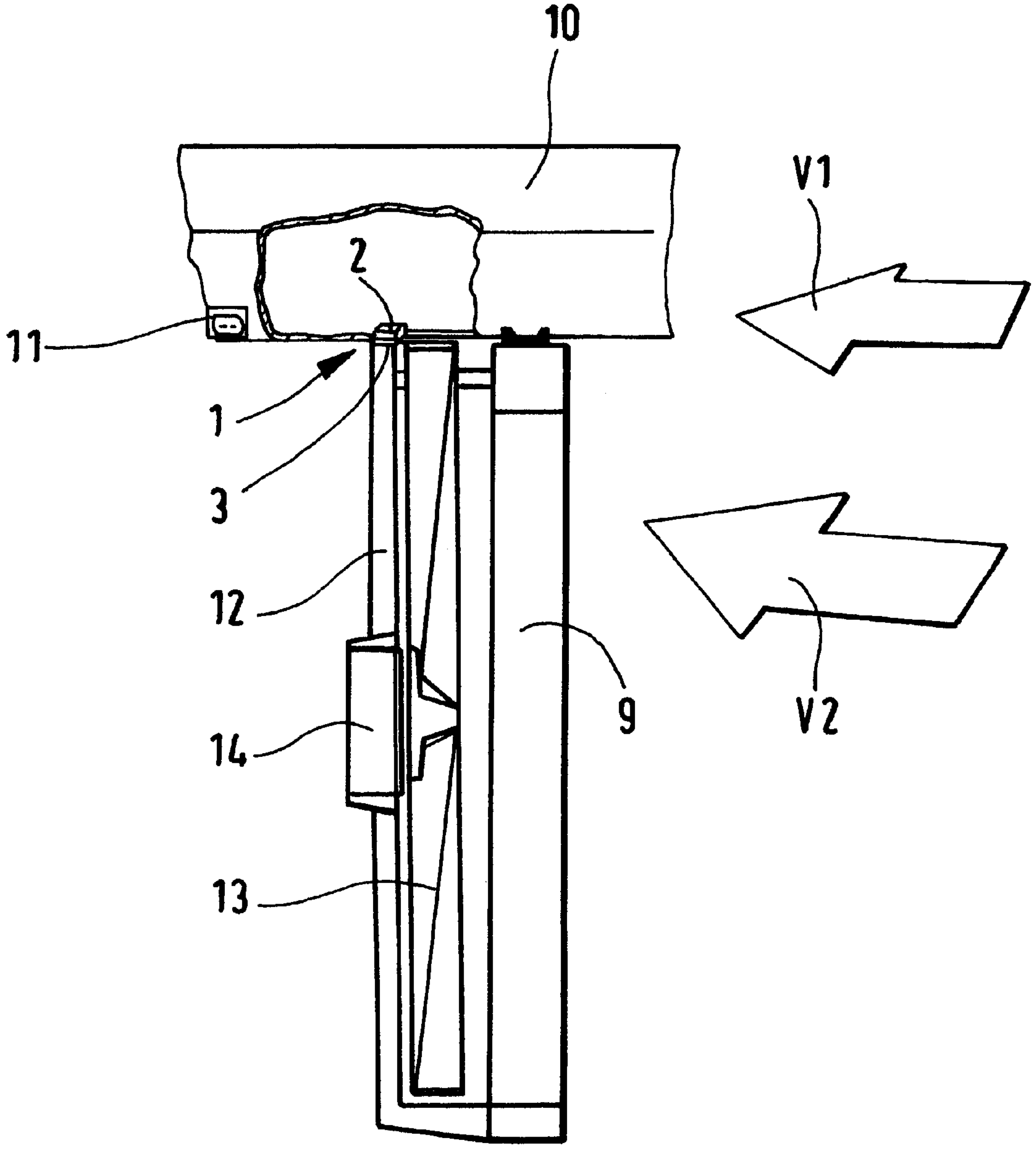
FIG. 2 is an illustration for explaining a preferred installed position of the temperature sensing device according to the invention.

FIG. 1 is a simplified sectional view of a temperature sensing device 1 having a first sensor element 2 and a second sensor element 3, the first sensor element 2 being provided for sensing the temperature of an engine intake air flow V1 and the second sensor element 3 being provided for sensing the temperature of the radiator air flow V2 flowing out of an engine radiator (FIG. 2, reference number 9).

The first sensor element 2 and the second sensor element 3 are arranged on a common carrier structure 4 which, in this case, is made of a plastic material and can be mounted by way of a fastening device 5*a*, 5*b* on an air guiding device 5*c* through which the engine intake air flow V1 flows.

In this embodiment, the two sensor elements 2, 3 are constructed as PTC sensors, with connection cables 6 which can be connected by way of a plug connector device with a cable tree branch provided on the vehicle side. This connector plug device is preferably constructed integrally with the carrier structure 4.

In this view, an air guiding device 7 is provided at a distance of approximately 4 to 5 mm above the first sensor element 2. By way of this air guiding device 7, a partial flow V1' of the engine intake air flow V1 flowing past is intensively guided over the first sensor element 2 in order to reliably sense the temperature of the intake air.

An air guiding device 8 is also provided for the second sensor element 3. By way of this air guiding device 8, a partial flow V2' of the air flow V2 flowing out of a radiator or vehicle heat exchanger and heated by the engine cooling water is intensively guided over the second sensor element 3.

In this embodiment, the carrier structure 4 of the temperature sensing device 1 comprises a basic body 9 made of a plastic material by way of which a sufficient thermal separation of the two sensor elements 2, 3 is also achieved.

The measuring values centrally generated by the described temperature sensing device 1 for the temperature of the engine intake air as well as the temperature of the heated air flowing out of the engine radiator can be fed by way of a single plug connector to a control device, particularly to an electronic engine management system for implementation of OBD-relevant functions. The temperature sensing device can also be part of an automatic air-conditioning system (AOC sensor).

The measuring signals generated by the first sensor element 2 and indicative with respect to the temperature of the engine intake air flow as well as the signals sensed by way of the second sensor element 3 and indicative with respect to the temperature of the air flowing out of the engine radiator can be used for optimizing the operation of the internal-combustion engine as well as for monitoring the latter.

FIG. 2 illustrates in the form of a schematic diagram how the temperature sensing device 1 according to the invention can be arranged in a motor vehicle. In this embodiment, the first sensor element 2 and the second sensor element 3 are in an area situated behind a radiator 9 viewed in the air stream approach direction. An air guiding device 10 guiding the engine intake air flow V1 extends close enough to a site over which a radiator air flow V2 sweeps that the temperatures of the engine air as well as of the air guided through the radiator 9—and heated in the process—can be sensed essentially centrally.

The measuring signals generated by the first sensor element 2 and the second sensor element 3 can be transmitted by way of a connector plug device 11 to a cable tree branch provided on the vehicle side. The connector plug device 11 comprises a coupling section which has an integral construction with the air guiding device 10.

In addition, the air guiding device 10 is connected with a suspension device 12 of the radiator blower 13. This suspension device 12, in turn, is coupled with the radiator 9. It is possible to also couple the line devices provided for the voltage supply of a motor 14 of the blower device 13 by way of the above-mentioned connector plug to the line system provided on the vehicle side. This results in even further reduced cabling expenditures. As an alternative thereto, it is possible to couple the two sensor elements 2, 3 by way of contact devices, which are integrated in a blower connector plug, with the vehicle-side line system. In the case of the above-described embodiment, the sensor device 1 is mounted on a structural component of the air guiding device 10. However, the invention is not limited to such an embodiment. It is, for example, also possible to mount the temperature sensing device 1, for the combined sensing of the engine intake air as well as of the air heated by a radiator 9, on a structural component assigned to the blower device 13 or to the radiator 9 itself.

By way of the temperature sensing device 1 according to the invention, it is also possible to sense additional system parameters, such as the cooling water temperature in the radiator 9. A temperature sensing device 1 of this type is preferably constructed on a structural component assigned to the radiator 9. By way of the solution according to the invention, it becomes possible to construct the vehicle radiator, the blower device, and its suspension device, as well as the components of the engine intake air guiding device 10, which are situated in the forward region of the vehicle, as a preassembled construction unit which is equipped with the required sensor devices and which can be advantageously mounted within the scope of an automated mounting operation. It is possible to construct the connector plug device 11 such that, within the scope of the installation of the above-mentioned structural unit into the vehicle, it automatically engages with the connector components provided on the vehicle side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

We claim:

1. A temperature sensing device for an internal-combustion engine, comprising:

a carrier structure, a first sensor element accommodated on the carrier structure, a second sensor element accommodated on the carrier structure, a device for feeding at least a partial flow of an engine intake air flow to the first sensor element, and a device for feeding at least a partial flow of a radiator air flow passed through an engine radiator to the second sensor element, wherein the carrier structure is arranged in an area in which the intake and radiator air flows run adjacent to one another.

2. The temperature sensing device according to claim 1, wherein the first and second sensor elements are combined by way of the carrier structure to form a constructional unit.

3. The temperature sensing device according to claim 1, wherein the first and second sensor elements are connected by way of common cabling with a cable tree branch provided on a vehicle side.

4. The temperature sensing device according to claim 3, wherein the cabling connecting the first and second sensor elements is connected by way of a common connector plug structure with the cable tree branch provided on the vehicle side.

5. The temperature sensing device according to claim 4, wherein the connector plug structure is integrally constructed with the carrier structure.

6. The temperature sensing device according to claim 1, wherein the carrier structure is made of a plastic material.

7. The temperature sensing device according to claim 1, wherein the carrier structure forms a separating wall which separates the two partial flows from one another at least before they sweep over the sensor elements.

8. The temperature sensing device according to claim 1, wherein the carrier structure is integrally constructed with an air guiding element.

9. The temperature sensing device according to claim 1, wherein the carrier structure is integrally constructed with an engine intake air guiding device.

10. The temperature sensing device according to claim 1, wherein the carrier structure is integrated in a blower suspension.

11. The temperature sensing device according to claim 1, wherein the carrier structure is provided on a radiator water tank.

12. The temperature sensing device according to claim 1, wherein the first and second sensor elements are arranged adjacent to one another.

13. The temperature sensing device according to claim 1, wherein the carrier structure is arranged in an area in which a line device for guiding an engine intake air flow extends past a radiator blower.

14. The temperature sensing device according to claim 13, wherein the line device is coupled with the engine radiator of the radiator blower in said area.

15. Temperature sensing device according to claim 3, and further comprising another sensor element provided for sensing cooling water temperature, wherein the other sensor element is also connected by the common cabling with the cable tree branch provided on the vehicle side.

16. The temperature sensing device according to claim 2, wherein the first and second sensor elements are connected by way of common cabling with a cable tree branch provided on a vehicle side.

17. The temperature sensing device according to claim 2, wherein the connector plug structure is integrally constructed with the carrier structure.

18. The temperature sensing device according to claim 2, wherein the carrier structure is made of a plastic material.

19. The temperature sensing device according to claim 2, wherein the carrier structure forms a separating wall which separates the two partial flows from one another at least before they sweep over the sensor elements.

20. A process for sensing air flow temperatures with a temperature sensing device for an internal-combustion engine including a carrier structure, a first sensor element accommodated on the carrier structure, and a second sensor element accommodated on the carrier structure, comprising:

feeding at least a partial flow of an engine intake air flow to the first sensor element, feeding at least a partial flow of a radiator air flow passed through an engine radiator to the second sensor element, the carrier structure being arranged in an area in which the intake and radiator air flows run adjacent to one another, and sensing the temperatures of the intake and radiator air flows.

* * * * *